(12) United States Patent
Ghalaty et al.

(10) Patent No.: US 12,348,540 B2
(45) Date of Patent: Jul. 1, 2025

(54) TECHNIQUES TO GENERATE RELATIONSHIP GRAPHS UTILIZING DATA IN AN ENTERPRISE SYSTEM ENVIRONMENT

(71) Applicant: Capital One Services, LLC, McLean, VA (US)

(72) Inventors: Nahid Farhady Ghalaty, San Diego, CA (US); Vincent Pham, Champaign, IL (US); Lee Adcock, Midlothian, VA (US); Ana Cruz, New York, NY (US)

(73) Assignee: Capital One Services, LLC., McLean, VA (US)

( * ) Notice: Subject to any disclaimer, the term of this patent is extended or adjusted under 35 U.S.C. 154(b) by 519 days.

(21) Appl. No.: 17/406,724

(22) Filed: Aug. 19, 2021

(65) Prior Publication Data

US 2023/0054704 A1 Feb. 23, 2023

(51) Int. Cl.
*H04L 9/40* (2022.01)
*G06F 16/901* (2019.01)
*G06F 16/906* (2019.01)

(52) U.S. Cl.
CPC ...... *H04L 63/1425* (2013.01); *G06F 16/9024* (2019.01); *G06F 16/906* (2019.01); *H04L 63/1416* (2013.01)

(58) Field of Classification Search
CPC ............ H04L 63/1425; H04L 63/1416; G06F 16/9024; G06F 16/906
See application file for complete search history.

(56) References Cited

U.S. PATENT DOCUMENTS

| | | | | |
|---|---|---|---|---|
| 10,742,670 | B1* | 8/2020 | Kayyoor | G06F 21/56 |
| 11,349,857 | B1* | 5/2022 | Shah | G06F 16/2379 |
| 11,514,054 | B1* | 11/2022 | Borthwick | G06F 16/9024 |
| 12,159,283 | B2* | 12/2024 | Galka | G06Q 20/0655 |
| 2015/0047026 | A1* | 2/2015 | Neil | H04L 63/1433 726/22 |
| 2017/0279848 | A1* | 9/2017 | Vasseur | H04W 12/02 |
| 2018/0027004 | A1* | 1/2018 | Huang | H04L 43/04 726/23 |
| 2018/0198819 | A1* | 7/2018 | Lee | G06F 16/9024 |
| 2019/0379684 | A1* | 12/2019 | Brown | H04L 63/20 |
| 2020/0228558 | A1 | 7/2020 | Apostolopoulos | |
| 2020/0304462 | A1* | 9/2020 | Kopp | H04L 63/145 |
| 2021/0058418 | A1* | 2/2021 | Murphey | H04L 63/145 |
| 2022/0067273 | A1* | 3/2022 | Shin | G06F 16/9024 |
| 2022/0083662 | A1* | 3/2022 | Grobman | G06N 20/00 |
| 2022/0414664 | A1* | 12/2022 | Liu | G06Q 20/4016 |
| 2023/0053063 | A1* | 2/2023 | Dai | G06F 16/9024 |
| 2023/0291756 | A1* | 9/2023 | Monnig | H04L 63/1425 726/4 |

\* cited by examiner

*Primary Examiner* — Carl G Colin
*Assistant Examiner* — Andrew Suh
(74) *Attorney, Agent, or Firm* — KDW FIRM PLLC

(57) ABSTRACT

Embodiments discussed herein include systems, devices, methods, and techniques to process data, generate one or more graphs, and utilize the one or more graphs to detect anomalies.

20 Claims, 13 Drawing Sheets

TECHNIQUES TO GENERATE RELATIONSHIP GRAPHS UTILIZING DATA IN AN ENTERPRISE SYSTEM ENVIRONMENT

BACKGROUND

Detecting malicious activity has long been a priority for computer administrators. In computer networks, users employ devices such as desktop computers, laptop computers, tablets, smart phones, browsers, etc. to interact with others through computers and servers that are coupled to the network. Malicious activities can cause harm to the network and computing devices, and/or its users. Malicious activities may include unauthorized access or subsequent unpermitted use of resources and data. Administrators for corporations spend millions of dollars each year to detect such activities. For example, Administrators typically deploy an army of hardware and software to detect and deter malicious. Examples may include utilizing security appliances at various points in a system and software such as anti-virus or anti-malware software. However, these hardware and software solutions are expensive and utilize computer resources that may be better used processing other information and data.

BRIEF SUMMARY

Graph theory is used to model and study all kinds of things that affect our daily lives: from transatlantic shipping routes to integrated circuits, from molecular bonds to animal food webs. A graph generally includes nodes or vertices connected by lines or edges. The nodes or vertices may represent anything from people to ships, and the lines or edges represent relationships between the nodes.

Embodiments discussed herein include systems, methods, and techniques to utilize graph theory to generate relationship graphs to detect anomalies in enterprise systems. For example, embodiments may include a system to generate graphs of associates and events based on digital footprints of the associates. The system may include a data store comprising data, the data comprising the associates and the events performed by the associates; one or more processors coupled with the data store; and memory comprising instructions. The instructions are configured to cause the processor to retrieve the data from the data store; generate, with the data, a graph comprising associate nodes and event nodes, wherein the associate nodes to connect with the event nodes via edges; generate a grouping of associate nodes comprising two or more of the associate nodes, each associate node in the grouping of associate nodes comprising a number of edges to the event nodes in common with each other above a threshold value; determine an associate node of the grouping of associate nodes having an edge with an event node, wherein the event node having a second number of edges with other associate nodes of the grouping of associate nodes below an edge threshold value; and generate an indication identifying the associate node.

Embodiments may also include a system including a data store comprising data, the data comprising associates and events performed by the associates; one or more processors coupled with the data store; and memory comprising instructions. The instructions may be configured to cause the processor to generate, with the data, a graph comprising associate nodes and event nodes, wherein the associate nodes to connect with the event nodes via edges; group each of the associate nodes into one of a plurality of buckets based on a number of times an associate of a particular associate node performed an event associated with a particular event node; determine a bucket of the plurality of buckets is an anomaly based on a number of associate nodes in the bucket and a threshold value; and send an indication to indicate the associate nodes of the bucket is the anomaly.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
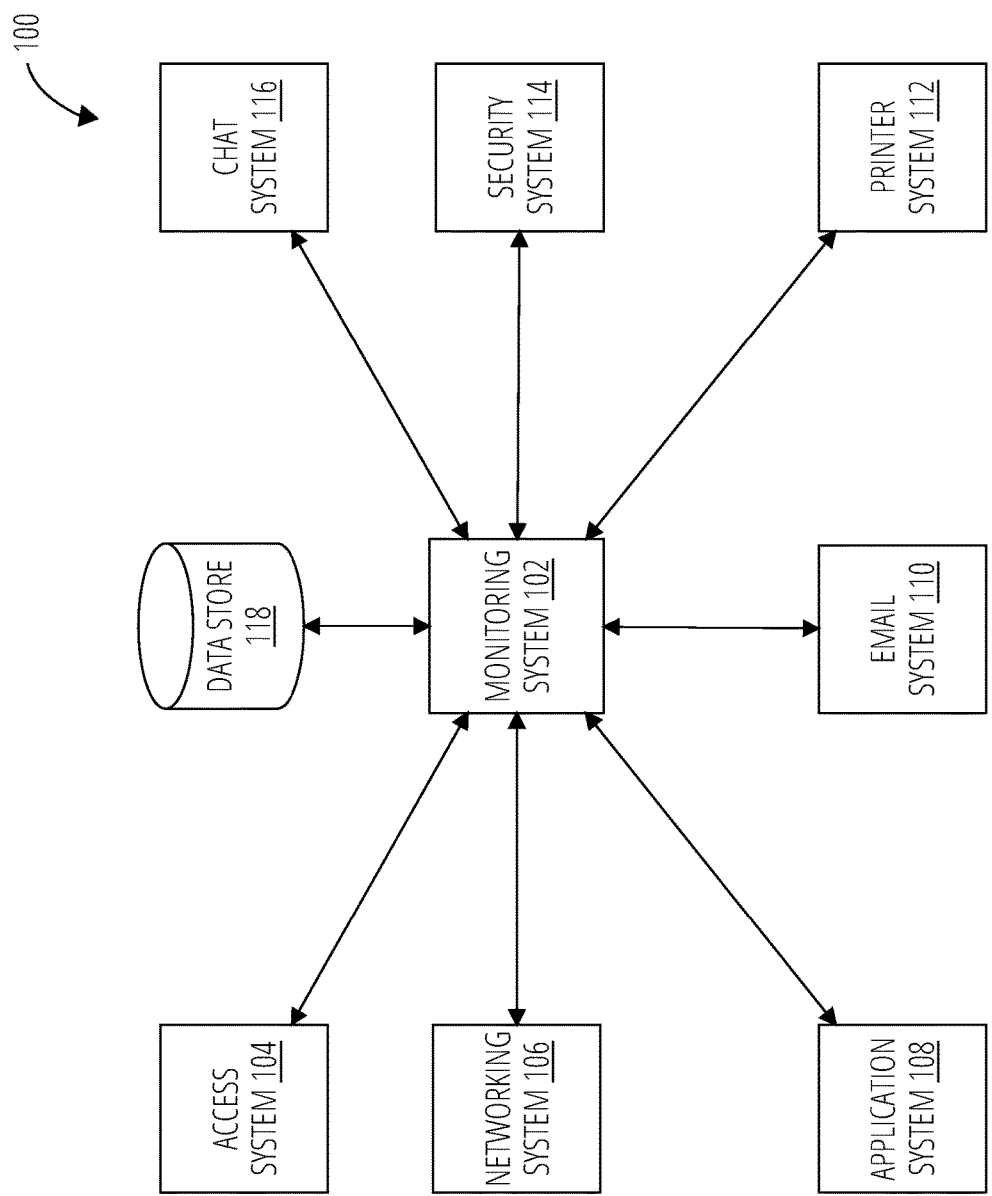
FIG. 1 illustrates an example of a system 100 configured to operate in accordance with embodiments discussed herein.

Embodiments discussed herein may be generally directed to generating graphs representing relationships using data collected in an enterprise system, storing the graphs in a graph data structure, and analyzing the graphs to detect potential threats to the enterprise and enterprise system. The graphs may illustrate relationships between associates and events the associates perform within and outside the enterprise system. A graph may include a set of nodes or vertices and a set of edges that couple nodes to other nodes. The set of nodes may be a finite and non-empty set representing the associates and events. The edges include a set of pairs of nodes, including each endpoint. In embodiments discussed herein, the edges may link nodes that are related to each other based on one or more criteria, e.g., nodes of associates having a number of events in common with each other may be linked via edges. As will be discussed in more detail, other criteria and edge detection techniques may be used to link nodes together via the edges.

In embodiments, a graph may be stored in a graph data structure in a system's data store. The graph data structure may be a list structure, a matrix structure, or a combination thereof. The system may utilize the structure advantageously to apply one or more threat detection techniques to detect potential threats to the enterprise system based on the relationships between the associates and the events. For example, the graph data structure enables the system to quickly access the graph data and build the graph for presentation in a graphical user interface (GUI). Specifically, the system may utilize a list graph data structure in situations where the graph is sparse and typically requires less storage and memory utilization. A matrix graph data structure may be used when the graph is complex and in situations where the system is required to quickly access data and build relationships with fewer processing cycles and less processing time.

The system may utilize the graph data structures to apply one or more algorithms to perform the threat detections in embodiments. For example, using a graph stored in a data structure enables the system to quickly build the graph for display and analysis by applying the threat detection algorithms, including grouping associate nodes based on common events and detecting when an associate is performing events that are outside of the norms for the group. In another example, the system may apply a closeness algorithm to detect associates and associate nodes that are close to an identified threat indicating that they may be potential threats. In a third example, the system may group associates for a particular event type and detect when one or more associates are an outlier for a particular event type.

In embodiments, the system may store data to perform each of the threat detection algorithms in the data structure that enable the system to perform these operations more quickly over previous solutions. For example, the system may store an indication of the shortest path between nodes in the graph data structure. When a closeness algorithm is applied, the system may quickly determine nodes that are close or within a threshold number of edges of an identified threat. In another example, the system may identify the groups of associate nodes based on the criteria and store an indication of which nodes are coupled with nodes that are not in a group below a threshold number enabling the system to quickly identify associates that perform events outside of the norms. In a third example, the system may utilize the graph data structures to store data indicating the number of times an associate (associate node) performs a specific event type enabling the system to quickly identify outlier nodes.

In embodiments, the system may present the graph and the information, including potential threat indications, to a user or administrator in the GUI on a display device. The system may enable the user to manipulate the graph, change views, zoom in and out, select particular nodes, etc. In addition, the system may highlight threats and potential threats in the GUI, enabling the user to quickly determine which associates perform unwanted operations.

Embodiments may further include the system performing one or more remedial operations. For example, the system may send a text message to the device alerting a user of a potential threat and/or may prevent an associate from performing operations to cause a problem. For example, the system may lock out an associate from performing tasks, such as accessing a particular room, accessing a particular system, accessing email, etc. These and other details will become more apparent in the following description.

FIG. 1 illustrates an example of a system 100 configured to perform operations in accordance with embodiments discussed. For example, the system 100 includes a monitoring system 102 configured to collect data from one or more other systems (104-116) and store the data in a data store 118. The monitoring system 102 may apply one or more graph theory algorithms to the data to generate graphs and detect potential threats to system 100. In one specific example, the system 100 may be configured to detect potential threats in an enterprise system, such as one operated by a business or corporation, but embodiments are not limited in this manner. The system 100 is also configured to perform one or more remedial actions or operations when potential threats are detected. For example, the system 100 may be configured to send alerts, highlight particular threats in a graph, and change one or more functions of the system 100 itself.

In embodiments, the system 100 may include one or more networks (not shown), such as the Internet, an intranet, a local area network (LAN), a personal area network (PAN), a wide area network (WAN), and so forth, and each of the systems may be coupled via the one or more networks and communicate data between each other. In one example, the monitoring system 102 may be coupled with an access system 104, a networking system 106, an application system 108, email system 110, a printer system 112, a security system 114, and a chat system 116 via the one or more networks. Each of the systems 104-116 may be coupled with and provide services to other computing devices (not shown), such as personal computers, laptops, mobile devices, servers, workstations, access control devices, networking devices, printers, security devices, and so forth. The other computing devices may be configured to provide one or more services to the associates. For example, an associate may use a personal computer or a laptop to perform tasks to conduct their day-to-day business, such as sending emails, printing documents, chatting with other associates, scheduling/conducting meetings, generating documents and work product, and so forth.

In embodiments, the systems 104-116 may be first-party organization systems, third-party organization systems, or a combination thereof. The first-party organization systems may include systems that are owned, operated, and/or controlled by a specific business, i.e., the business to detect potential threats. Examples of first-party organization systems include a security or access system controlled by the business, an internal networking system (Intranet), an internal application system, an internal email system, etc. The third-party organization systems may be systems owned, operated, and/or controlled by a third-party organization, such as another business's email system, a cloud-based computing/storage system (e.g., Amazon Web Services (AWS), an online chat program (e.g., Slack), and so forth.

In embodiments, each of the systems 104-116 may log and store data for each event or task performed by the respective system. The data or logs may be communicated to the monitoring system 102 and stored in the data store 118 for analysis to detect potential threats. The data store 118 may be any type of data store and may be configured to store the data in a database or other file configuration. In embodiments, the data store 118 may be implemented as any type of data storage device. For example, the data store 118 may be a network attached storage (NAS) system, a data storage array, a cloud-based storage system, etc. The monitoring system 102 may receive the data from the systems 104-116 and write or store the data to the data store 118. The monitoring system 102 may also retrieve or read the data from the data store 118 to analyze the data, generate graphs, detect potential threats, and initiate remedial actions.

In embodiments, the system 100 includes an access system 104 configured to provide access services to associates. For example, the access system 104 may be coupled with one or physical entry points of a building and control the access into and out of the building. The access system 104 may include one or more card or 'badge' readers that are configured to read data on an identification card or access device and control access to an area or another device, for example. The access system 104 may control physical access points, e.g., buildings, elevators, specific rooms, etc. The access system 104 may also enable associates to access devices, such as personal computers, email servers, conference room equipment, etc.

The access system 104 may be configured to collect data associated with each event, e.g., access attempts, and send the data to the monitoring system 102. The data may include information such as a location of the event, the time/date, a personal identifier for the event, a result (granted/denied), etc. The data may be collected and sent to the monitoring system 102 to store in the data store 118.

The system 100 may also include a networking system 106 to provide networking services to associates and their devices. The networking system 106 may include networking equipment to enable associates to access the Internet, an enterprise intranet, networking repositories (Sharepoint®, GitHub®, GForge®, etc.), cloud storage systems (Google Drive®, Dropbox®, Box®, etc.), and so forth. For example, the networking system 106 may include networking access points, gateways, routers, switches, computing devices, servers, etc.

In embodiments, the networking system 106 may be configured to collect data for every event to provide a service to an associate's device. For example, the networking system 106 may collect data for each system accessed, each file accessed, websites visited, etc. The networking system 106 may also collect the number of times each associate performed an event, e.g., accessed a particular website 50 times, and how long the associate's device spent performing a particular event, e.g., spent 30 minutes on a particular website. Embodiments are not limited to these examples. Further, the networking system 106 may communicate the data to the monitoring system 102 for storage in the data store 118.

In embodiments, the system 100 includes an application system 108 configured to provide applications to associates and their devices. For example, the application system 108 may be configured to provide enterprise software, such as Microsoft® Office® products, Salesforce®, iCIMS®, Monday®, Zendesk®, Amazon Web Services (AWS®), Google® Analytics, Stripe®, Datapine®, etc. In embodiments, the application system 108 may be configured to collect data associated with each provided application. For example, the application system 108 may collect data, including the amount of time an associate spends using an application, whether an associate accessed a particular application, how many times an associate accessed a particular application, etc. The application system 108 may send the data to the monitoring system 102 for storage in the data store 118.

In embodiments, the system 100 includes an electronic mail (email) system 110 to provide email services for the associates via computing devices. For example, the email system 110 may enable associates to send and receive emails with other associates internal and external to the system 100. The email system 110 may be configured to collect any type of data associated with an email and send it to the monitoring system 102 for storage in the data store 118. The data may include sender and receiver information (e.g., email addresses), time/date of email, the content of the email, whether the email was delivered/received successfully, etc. Embodiments are not limited to these examples.

The system 100 can also include a printer system 112 configured to provide printer services for associates. For example, the printer system 112 may be configured to enable associates, via computing devices, to print documents to any number of printers. The printer system 112 may include a number of printers coupled to a network and accessible to the associates, for example. The printers may be any type of printer, such as laser printers, color laser printers, inkjet printers, enterprise printers, etc. In embodiments, the printer system 112 may collect data associated with each print job that it processes to print a document. The data may include information about the document (file name, size, text/graphics, etc.), the associate or device requesting the print job, the printer performing the print job, the time/date, etc. The data may be collected and sent to the monitoring system 102 for storage on the data store 118 by the printer system 112.

In embodiments, the system 100 may include a security system 114 configured to provide security services. In some instances, the security system 114 includes access point detection devices, motion sensors, CO2 sensors, smoking detecting sensors, glass break sensors, and so forth. The security system 114 may also include one or more keypads or devices to enable associates to arm and disarm the security system 114. In embodiments, the security system 114 may collect data, such as an indication of a triggered alarm, location/type of alarm, an indication as to whether an alarm was armed or disarmed, an associate who armed/disarmed the system, or any other type data that can be detected by one or more of the sensors. The security system 114 may send the data to the monitoring system 102 for storage in the security system 114.

In some instances, the system 100 may include a chat system 116 configured to enable associates to chat with other associates within an enterprise system or outside of the enterprise system. The chats may be texted-based chats, video-based chats, audio-based chats, etc. Examples of a chat system 116 may include Slack®, Teams®, Zoom®, Google® Chat, Discord®, Chanty®, etc. In embodiments, the chat system 116 may collect data associate with a chat, including the content of the chat, the participants of the chat, a date/time of the chat, the length of the chat, and so forth. The data may be sent to the monitoring system 102 and stored in the data store 118.

In embodiments, the system 100 includes a monitoring system 102 configured to receive the data from the other systems 104-116 and store the data in the data store 118. As will be discussed in more detail in the following description, the monitoring system 102 is also configured to perform additional operations to detect potential threats based on the collected data. A threat may include anything harmful that may occur to the system 100, the enterprise, the business, or any other entity. Examples of threats include conducting corporate espionage, sharing sensitive information with unauthorized personnel, accessing restricted areas without permission, causing system damage, causing financial damage, etc. A threat may occur maliciously or accidentally, and embodiments are not limited in this manner.

The monitoring system 102 may analyze the data, including applying graph theory to the data to detect the potential threats. For example, monitoring system 102 may generate a graph including nodes and edges. Each of the nodes may represent an associate, an event, or an event type. Each of the edges may couple one node with another node based on a relationship between the nodes. For example, an associate node may be coupled with an event node based on the associate performing the event.

Similarly, an associate node may be coupled with an event type node based on the associate that performed the event type. An event type may be a category or type of event, and an event may be a specific instance. For example, an event type may be sending an email, while an event may be a specific email sent. In another example, meetings may be an event type, while an event may be a specific meeting. Event and event type nodes may also be identified by any type of identifier, e.g., a label, a title, or another unique identifier.

An associate node may also be coupled with one or more other associate nodes based on relationships between the associates. For example, an associate node may be coupled with another associate node based on the associates of the nodes performing a number of same events above a threshold value, e.g., the associates have three or more events in common. For example, two or more associates may attend the same meeting, belong to the same working group, and send emails between each other, e.g., have at least three events in common and may be linked to each other via an edge. The threshold value may be configurable and set to any value. In some instances, associate nodes may be coupled based on the associates conducting or being involved in the same event. For example, an associate node may be coupled to another associate node based on the first associate sending an email to the second associate.

In embodiments, associate nodes may be identified by any type of identifier, e.g., an email address, an employee identification, a username, a first name and/or last name, etc. Associates may be any person with access to and/or utilizes one or more services provided by the system 100. For example, an associate may be an employee of a business providing the system 100. In another example, an associate may be a person outside of the business that sends/receives an email to an associate within the business. Embodiments are not limited in this manner.

In embodiments, the monitoring system 102 may apply one or more analysis techniques to a graph to detect potential threats based on the relationships defined in the graph between the nodes and edges. In one example, the monitoring system 102 may analyze relationships between a node and its relationships with one or more other nodes of known threats. Specifically, the monitoring system 102 may apply a closeness centrality analysis to determine a closeness between a node and the other nodes determined to be a threat. The closeness may be calculated as the reciprocal of the sum of the length of the shortest paths between the node and the other nodes (threats) in the graph, for example. In some instances, the closeness may be normalized and represents the average length of the shortest paths instead of their sum. The average route distances between the node and the nodes associated with threats may be used. Thus, a node may be considered a potential threat when its closeness calculation indicates that the node is within (close) a centrality threshold value.

In some instances, the monitoring system 102 may apply a community detection analysis to the graph to determine potential threats. For example, the monitoring system 102 may generate one or more nodes based on their relationship with each other. The monitoring system 102 may group nodes with a number of other nodes in common above a threshold value. For example, the monitoring system 102 may group associate nodes in a group that has at least three event nodes (events) in common with each other. The monitoring system 102 may then apply community detection techniques to detect a node coupled with one or more other nodes that are not in common with the rest of the nodes in the group. For example, monitoring system 102 may group the nodes and then determine a node in the group is coupled with one or more other nodes not in common with the group, e.g., an associate node coupled with an event node that's not performed by any other associate node in the group, to detect a potential threat. In some instances, the node may be required to have a number of nodes above a below value not in common with the other nodes in the group, e.g., five or fewer nodes. Embodiments are not limited to these examples.

In embodiments, the monitoring system 102 may analyze the graph to detect outliers as potential threats. For example, the monitoring system 102 may generate buckets of event types, where each bucket indicates a range of events of the event type performed by the associates. In one specific example, the monitoring system 102 may generate buckets based on a number of emails communicated by the associates. A first bucket may represent a range of 1-10 emails, a second bucket may represent a range of 11-100 emails, and a third bucket may represent a range of 101-1000 emails. The range may be defined over a period of time, e.g., emails sent within the last week. Each of the buckets or event types may be represented as a node in the graph, and each associate may be analyzed and coupled with the appropriate corresponding bucket. For example, an associate node may be coupled with the second bucket if the associate sent 50 emails in a week. In some instances, the bucket sizes may be predetermined. However, in other instances, the bucket sizes may be adjusted over a period of time based on a machine-learning application applied to the data. For example, a k-means classification technique may be applied to the data to break the number of emails sent daily into different buckets. In some instances, a historical analysis may be applied to historical data to determine the size of the buckets.

In embodiments, each associate node may be coupled with a particular event type (bucket) node. The monitoring system 102 may detect outliers, e.g., a number of coupled associate nodes below or above a threshold value. For example, the graph may represent 500 associates, and each of the associates may be coupled with event type nodes representing a number of emails communicated in a given week, as discussed above. Most of the associate nodes may be coupled with the second bucket (11-100 emails) or the third bucket (101-1000). However, a small number of associate nodes may be coupled with the first bucket (1-10 emails), which may be considered an outlier and indicate a potential threat. For example, if less than 5 associate nodes are coupled with the first bucket, each of the coupled may be considered a potential threat. Embodiments are not limited to this specific example. In embodiments, the threshold value to determine an outlier may be adjusted over a period of time. As discussed above, the bucket sizes may be adjusted based on an application of machine-learning to data over a period of time, e.g., a k-means classification techniques, to determine the sizes of buckets and also determine the threshold value for outliers.

In embodiments, the monitoring system 102 may also be configured to display the data on a display device and perform remedial operations on the potential threats. For example, the monitoring system 102 may present a graph in a GUI on a display device. The monitoring system 102 may be configured to process one or more inputs to enable a user to manipulate the graph, e.g., change angle, zoom in/out, highlight particular nodes, highlight potential threats, indicate a number or distance between two nodes, and so forth. The nodes and edges may be presented in the GUI and include labels, e.g., their identifiers, such that the user may easily identify the node. A user may be able to click on a node via input device, e.g., a mouse or touchscreen interface, to select the node. Selecting the node may highlight a node and all of its connected nodes. In addition, selecting a node may cause a window to display the data associated with the node. The data may include the data collected by one or more systems 104-116, for example.

The monitoring system 102 may also alert or highlight a particular node when it is detected as a particular threat. Highlighting the node may include making the node "bold" or a different color, e.g., red, to draw attention to the node. In some embodiments, the monitoring system 102 may also be configured to send one or more alerts to other computing devices, e.g., an administrator's computer, a mobile device, etc. The message may include data associated with the potential threat, e.g., an identifier to identify the threat and a description of the detection/threat. Embodiments are not limited in this manner.

In embodiments, the monitoring system 102 may be configured to perform one or more remedial operations and improve the system's function. For example, the monitoring system 102 may detect one or more potential threats and be configured to send, via networking/cellular connections, a text or voice message alert to a mobile device associated with an administrator or other contact person. In another example, the system 100 may be configured to perform one or more operations to cause the GUI display to visually alert a user by highlighting potential threats. As mentioned, the monitoring system 102 may make the nodes of the potential threats bold or highlight in color on a display.

The monitoring system 102 may be configured to perform one or more operations to change the configuration of one or more systems 104-116 to prevent or mitigate the potential threat from occurring. For example, the monitoring system 102 may send one or more instructions to one of the systems 104-116 to prevent an associate (potential threat) from accessing the system, e.g., shutting down email for the associate, preventing the associate from accessing an area, locking the associate out of their computer, etc. Other examples may include preventing an associate from sending/receiving emails to a specific person or domain, preventing an associate from accessing a particular website, and downloading specific files. Thus, the remedial operations include self-healing aspects and improvements to the system 100 by preventing threats before they occur to the system 100 itself.

The following logic flow and example graphs provide additional operations that may be performed herein and by system 100.

Figure 2:
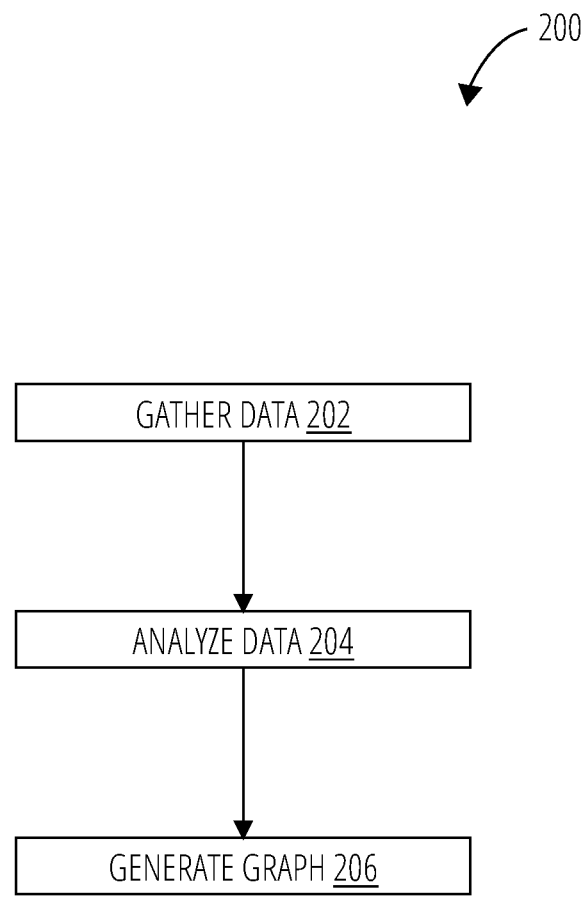
FIG. 2 illustrates an example of a logic flow 200 that may be performed in accordance with embodiments discussed herein.

FIG. 2 illustrates an example of a logic flow 200 that may be performed by the monitoring system 102 to generate a graph. In embodiments, the logic flow 200 may be performed by the monitoring system 102 any number of times on different data. In some instances, the logic flow 200 may be performed periodically (e.g., on a daily basis), and embodiments are not limited in this manner.

In embodiments, the logic flow 200 includes determining data at block 202. For example, the monitoring system 102 may determine data from the data store 118 to generate a graph. The data may be an entire data set from the system 100, or a subset of data. For example, the data may include data from one or more of the systems 104-116. The data may also be for a specified period of time, e.g., last year, last month, last week, etc., or the entire data set from the beginning of the collection, for example. In embodiments, the data gathered may be configured automatically to occur automatically or by an administrator via a user interface.

In embodiments, the monitoring system 102 may retrieve the data from the data store 118 by performing one or more retrieval operations or queries. In one example, the queries may be for all the data collected within a specified time range based on dates collected, for a specified group of associates based on associate identifiers, for a specified group of systems based on system identifiers, and so forth. In embodiments, a query may be any type of database queries, such as an SQL query or a no-SQL query, or other query technique, and embodiments are not limited in this manner.

At block 204, the logic flow 200 includes applying one or more analysis techniques to the data. Specifically, the monitoring system 102 may process the data to determine associates and events associated with the associated. Processing the data may include determining each associate based on associate identifiers identifying the associates, e.g., a name, a username, an employee identification number, a unique identifier, an email address, a screen name, a handle, and so forth. Further, the monitoring system 102 may determine each event that each associate performed. Each event may also be identified by a unique name or event identifier, e.g., "sent an email," "accessed door 2," "logged into a computer," etc. As previously discussed, each of the events may be identified as events via an indicator when it is collected by one of the systems 104-116. Moreover, the associates may be stored in the data store and associated with each event. For example, the data store 118 may store an entry for each event and include information in the entry, such as the associate performing the event, a name and description of the event, a time/date of the event, and so forth.

The monitoring system 102 may process the data and determine a link or edge to generate between each associate represented by a node and their respective events. Further, the monitoring system 102 may determine links between each of the associates. For example, the monitoring system 102 may determine to generate a link between two associates based on the two associates performing, conducting, and/or being involved in a number of common events above a threshold value. For example, the monitoring system 102 may be configured to generate a link between two associates when the two associates have five or more events in common, e.g., attending the same meeting, on the same email, in the same chat session, belong to the same workgroup, etc. In some instances, the monitoring system 102 may generate a link or edge between nodes based on the associates of those nodes being involved in the same event, e.g., sender/receiver of an email. Embodiments are not limited in this manner, and other graph-generating algorithms may be applied.

At block 206, the logic flow 200 includes generating a graph. For example, the monitoring system 102 may generate nodes representing an associate(s), event(s), or event type(s). Further, the monitoring system 102 may generate edges between each of the nodes that are linked to each other. Each of the edges may couple one node with another node based on a relationship between the nodes. For example, an associate node may be coupled with an event node based on the associate performing the event.

Similarly, an associate node may be coupled with an event type node based on the associate that performed the event type. An event type may be a category or type of event, and an event may be a specific instance. For example, an event type may be sending an email, while an event may be a specific email sent. Another example may be an event type of meeting, while an event may be a specific meeting. Embodiments are not limited to these examples.

An associate node may also be coupled with one or more other associate nodes based on relationships between the associates, as previously discussed. An associate node may be coupled with another associate node based on the associates of the nodes performing a number of common events above a threshold value. The threshold value may be configurable and set to any value.

In embodiments, the monitoring system 102 may generate the graph including the nodes and edges and store configuration to reproduce or present the graph on a display in one or more files. For example, the monitoring system 102 may generate each node having a unique node identifier attribute, such as the associate and edges coupled with the node. The one or more files may be any graph file format, such as .dot, LaTeX, or any other graph programming format.

In embodiments, the monitoring system 102 may store the graph in a data store using a data structure based on the graph structure. In some instances, the graph may be stored in the data store in a list structure, a matrix structure, or a combination thereof. In some instances, the monitoring system 102 may utilize a list structure when the graph is sparse and they tend to utilize less memory. However, in some instances, the monitoring system 102 may store the graph in a matrix structure, which may utilize more memory but provides faster access to consume a larger amount of data. List structures include the edge list, an array of pairs of nodes or vertices, and the adjacency list, which separately lists the neighbors of each node. Further, the monitoring system 102 may include a list for each node, including its adjacent nodes.

Matrix structures may include an incidence matrix, a matrix of 0's and 1's whose rows represent nodes and whose columns represent edges, and the adjacency matrix, in which both the rows and columns are indexed by nodes. In both cases, the monitoring system 102 may use a 1 indicates two adjacent objects, and a 0 indicates two non-adjacent objects. In embodiments, the monitoring system 102 may utilize a degree matrix that indicates the degree of nodes. In another example, the monitoring system 102 may use a Laplacian matrix, which is a modified form of the adjacency matrix that incorporates information about the degrees of the nodes and is useful in some calculations such as Kirchhoff s theorem on the number of spanning trees of a graph. In a third example, the monitoring system 102 may use a distance matrix having both its rows and columns indexed by nodes, but rather than containing a 0 or a 1 in each cell, it contains the length of the shortest path between two nodes. In these instances, the monitoring system 102 may utilize the length information in the matrix to perform the closeness calculations to determine nodes close to potential threats. Embodiments are not limited to these examples.

Figure 3A:
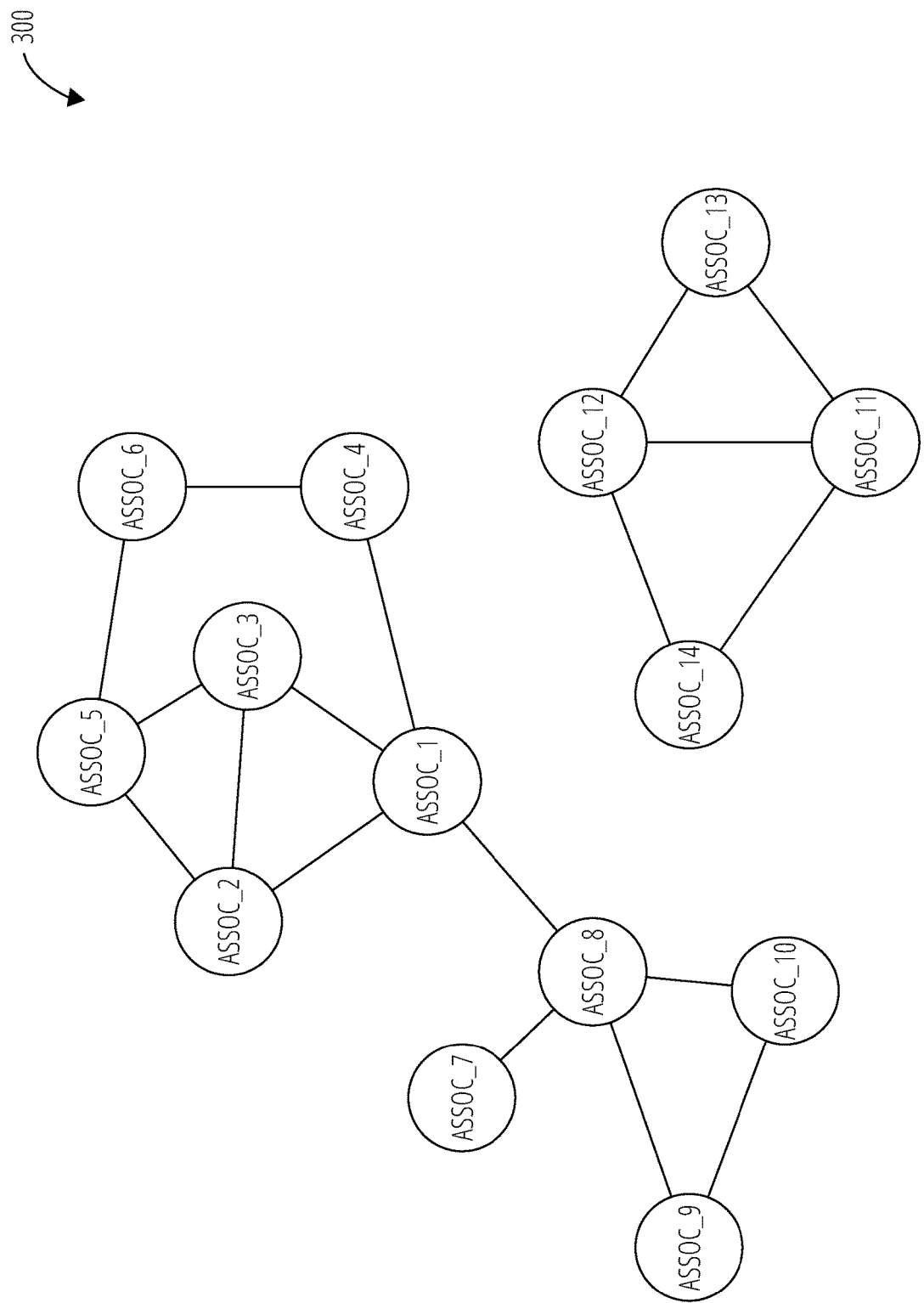
FIG. 3A illustrates an example of a graph 300 that may be generated based on operations discussed herein.
Figure 3B:
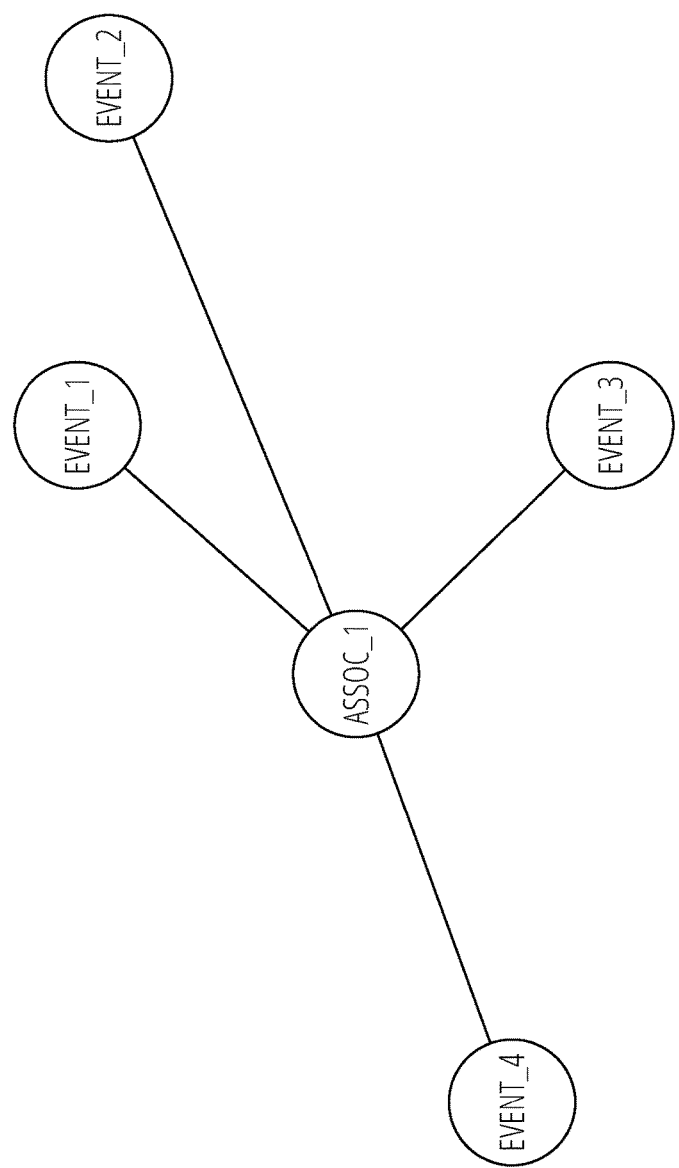
FIG. 3B illustrates another view of the graph 300 in accordance with embodiments.
Figure 3C:
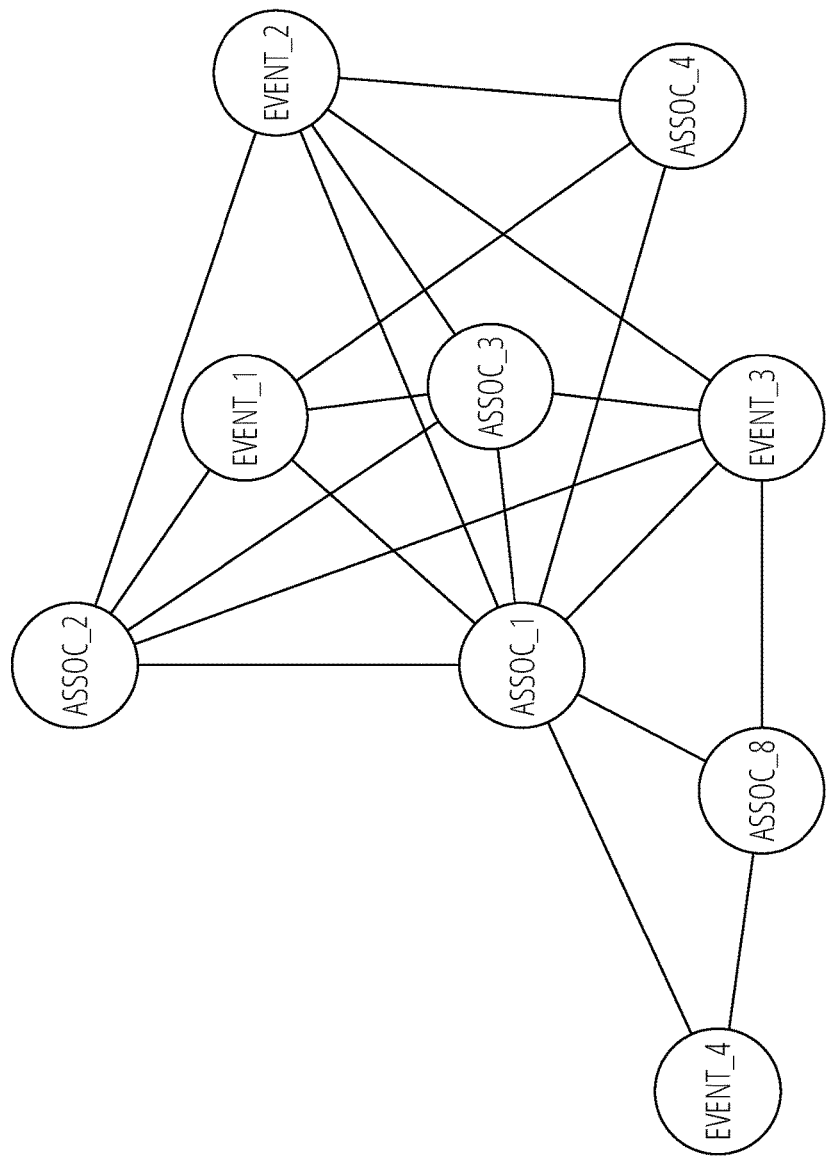
FIG. 3C illustrates another view of the graph 300 in accordance with embodiments.

FIGS. 3A-3C illustrate an example graph 300 that may be generated by the monitoring system 102 based on the data. Each of the FIGS. 3A-3C may represent a different view of the graph 300, as will be discussed in more detail below.

FIGS. 3A-3C illustrate an example graph 300 that may be generated by the monitoring system 102. In embodiments, the monitoring system 102 may generate and present the graph 300 in a graphical user interface (GUI) in a display. Further, the graph 300 may be interactive. For example, a user may be able to change views of the graph 300 and a user to zoom in or out on specific nodes and edges via an input device, such as a mouse or keyboard. The monitoring system 102 may also enable a user to highlight nodes and/or edges. Highlighting a specific node may present additional information about the node, e.g., the associate, a number of edges connected to the node, the node's most closely connected nodes, etc. In addition, the monitoring system 102 may be configured to present the graph 300 in a number of different views, e.g., a higher-level view or a lower-level view. In other words, a user may drill down on specific portions of the graph 300, as will be discussed in more detail below.

FIG. 3A illustrates a view of the graph 300, including a number of associate nodes coupled with each other via edges. The associate nodes are presented as circles, and the edges are presented as the lines or links between the circles. As previously discussed, the monitoring system 102 may generate an edge between two associate nodes based on a number of common events above (or equal) to a threshold value. In the illustrated view, the graph 300 includes 14 associate nodes coupled via edges. Associate nodes ASSOC_1 through ASSOC_10 are coupled to each other via one or more edges, and ASSOC_11 through ASSOC_14 are coupled with each other, but not with the other associate nodes (ASSOC_1-ASSOC_10). The first group of associate nodes (ASSOC_1 through ASSOC_10) and the second group of associate nodes (ASSOC_11 through ASSOC_14) do not have any common nodes or links. This indicates that the nodes in the two groups do not have enough events in common with each other, e.g., greater than the threshold value, or associates have not performed the same event with each other.

Further, graph 300 illustrates a number of associate nodes coupled via edges with more than one associate in common. For example, ASSOC_1 node is directly coupled with ASSOC_2, ASSOC_3, and ASSOC_4. Similarly, ASSOC_2 is also coupled with ASSOC_1 and ASSOC_3. The number of common edges may indicate that the associates of those nodes are in a particular grouping, as will be discussed in more detail. FIG. 3A illustrates graph 300 in a particular configuration; however, embodiments are not limited in this manner. In addition, graph 300, as presented in FIG. 3A, only illustrates associate nodes coupled with other associate nodes. However, each associate node may also be coupled with event nodes, as illustrated in FIGS. 3B and 3C.

FIG. 3B illustrates another view or additional detail of graph 300, including an associate node coupled with a number of event nodes, e.g., four in the presented example. As discussed, the associate node may be coupled with each of the event nodes based on an associate of the associate node performing or being associated with the event of an event node. In some instances, the event nodes may represent specific events, e.g., john doe sent jane doe an email. In other instances, the event node may represent an event type, e.g., sent emails. Embodiments are not limited in this manner.

In embodiments, the monitoring system 102 may be configured to present the view of graph 300 to a user in the GUI on a display. For example, a user may select a specific associate node and select to only show the associated events (event nodes). The user may be presented with the associate node of the associate and all of the event nodes for events performed by the associate. Embodiments are not limited in this manner.

FIG. 3C illustrates another example view of the graph 300, including associate nodes coupled with each other associate nodes and with event nodes. In the illustrated example, each of the associate nodes may be coupled with one or more of the other associate nodes based on the number of event nodes they have in common. In this example, an associate node may be coupled with another associate node when they have two or more common event nodes, and the threshold value may be two nodes. By way of example, FIG. 3C includes associate node (ASSOC_1)

coupled with associate nodes (ASSOC_2 and ASSOC_8). Associate node (ASSOC_1) may be coupled with associate node (ASSOC_2) because they have digital event nodes (EVENT_1, EVENT_2, and EVENT_3) in common. Associate node (ASSOC_1) is coupled with associate node (ASSOC_8) because they have event nodes (EVENT_3 and EVENT_4) in common with each other. However, associate nodes (ASSOC_2 and ASSOC_8) are not coupled or linked because they only have one event node in common (EVENT_3). Embodiments are not limited to this example.

Figure 4:
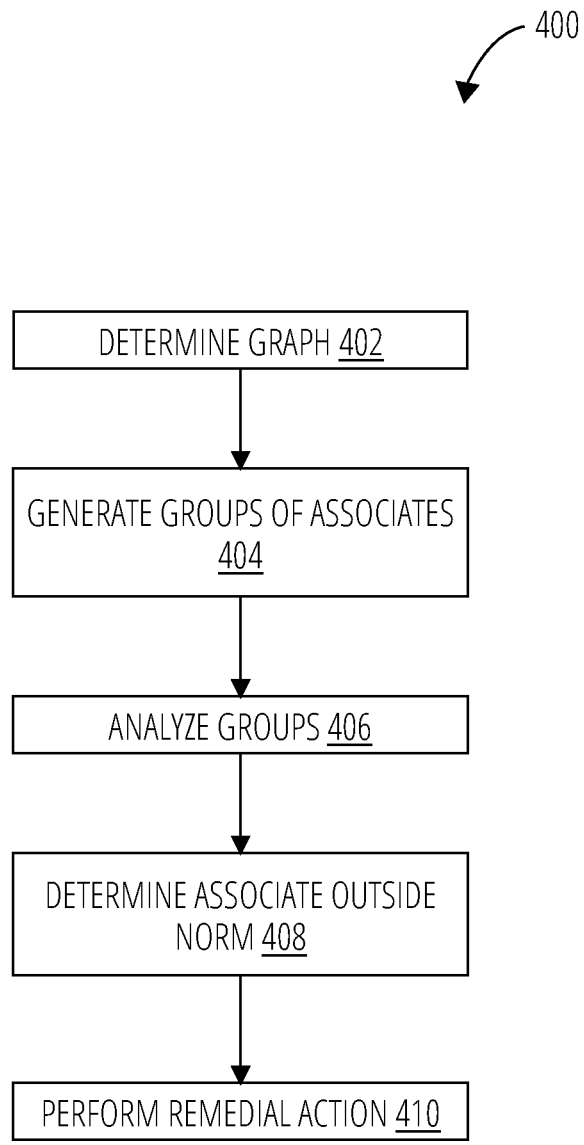
FIG. 4 illustrates an example of a logic flow 400 in accordance with embodiments.

In embodiments, the monitoring system 102 may generate a graph, such as graph 300, and store graph data associated with the graph in a data store. For example, the monitoring system 102 may store an indication of each node (associate nodes and event nodes) and an indication of each edge generated to couple the nodes. The indications may be to identify the nodes and the edges and include information or attributes about the node or edge, e.g., name, a type identifier (node/edge), attributes, and so forth. The data may be generated and stored in the data store, such as in a file. At any point in time, a user may utilize the GUI to access the graph to present the graph on a display and perform one or more analytic techniques on the graph to identify potential threats. FIG. 4 illustrates an example of a logic flow 400 that may be performed by the monitoring system 102.

FIG. 4 illustrates an example logic flow 400 that may be performed by the monitoring system 102 to analyze a graph and detect anomalies. In the illustrated logic flow 400, the monitoring system 102 is configured to perform one or more operations to group associates and detect when one of the associates is operating or conducting event(s) outside of the norms for the group.

At block 402, the logic flow 400 includes determining a graph and data to perform one or more analytics. The monitoring system 102 may determine the graph and data from the data store 118 based on one or more inputs. For example, the monitoring system 102 may receive a user input selecting a specific graph and data. In some instances, the logic flow 400 may determine the graph and data automatically. For example, the monitoring system 102 may be configured to automatically generate a graph and perform analytics on the data, e.g., periodically.

At block 404, the logic flow 400 includes generating one or more groups of associates or associate nodes. Specifically, the monitoring system 102 may generate one or more groupings of nodes based on criteria and their relationship with each other. In some instances, the criteria may include a number of other nodes in common above a threshold value. For example, the monitoring system 102 may group associate nodes in a group that has at least three event nodes (events) in common with each other. In some instances, the monitoring system 102 may apply other criteria, such as specific events in common and/or applying weights to specific events. In one example, the monitoring system 102 may group associate nodes having associates that are on the same chat channel. In another example, the monitoring system 102 may apply a higher weight for associates attending a number of the same meetings, indicating that the associates are part of the same working group. Alternatively, the monitoring system 102 may apply a lower weight for associates that communicate a number of emails between each other which may be a poor indicator that they are closely related. Thus, the monitoring system 102 may weigh the meetings more than the emails by using any type of weighting technique, e.g., a multiplier. Embodiments are not limited to this example.

In some instances, the monitoring system 102 may be configured such that groupings may be specified and stored in the data store. The data may include a group identifier that may be set for associates in the same group. For example, all associates of a first working group may have an identifier indicating that they are part of the first working group. In embodiments, a grouping may be defined by an administrator or in the data itself. In embodiments, associates and associate nodes may belong to more than one group, and embodiments are not limited in this manner. The monitoring system 102 may enable the size and scope of the groupings to be adjusted or defined. For example, one or more of the criteria may be adjusted to change the size of the group. In some instances, the size of the groupings may be adjusted based on a number of indicated potential threats based on one or more of the analyses. For example, suppose too many or too few associate nodes from a predicted normative number are being indicated as a potential threat. In that case, the size of the groupings can be adjusted up or down.

At block 406, the logic flow 400 includes applying one or more analysis techniques to the groups of associates to determine or identify potential threats. For example, the monitoring system 102 may then apply community detection techniques to detect a node coupled with one or more other nodes that are not in common with the rest of the nodes in the group. Specifically, a particular associate node in a group may be coupled with one or more event nodes that are not coupled with any other associate nodes in the group, indicating that the associate may be performing events or tasks outside of the group's norm. In some embodiments, the sensitivity of the analysis may be adjusted or determined for the monitoring system 102. For example, the monitoring system 102 may be configured to only alert on a potential threat when a particular associate node is coupled with a number of nodes (or more) that are not coupled with other associate nodes of the group. Thus, a node may be required to have a number of nodes above a threshold value not in common, e.g., five or more nodes. Embodiments are not limited to these examples.

At block 408, the logic flow 400 includes identifying associate nodes outside of the norms based on the analysis. And at block 410, the logic flow 400 includes performing a remedial action. For example, the monitoring system 102 may highlight the associate nodes that are potential threats in the GUI interface. In another example, the monitoring system 102 may send an alert message to an administrator of the system, e.g., via text message, email, or other messaging technique. In a third example, the monitoring system 102 may perform one or more operations to prevent the potential threat. An example may include the monitoring system 102 changing one or more settings to prevent an associate from accessing one or more of the systems, such as shutting off email, removing access to particular business areas, and preventing an associate from accessing their business computer etc. Embodiments are not limited in this manner.

Figure 5:
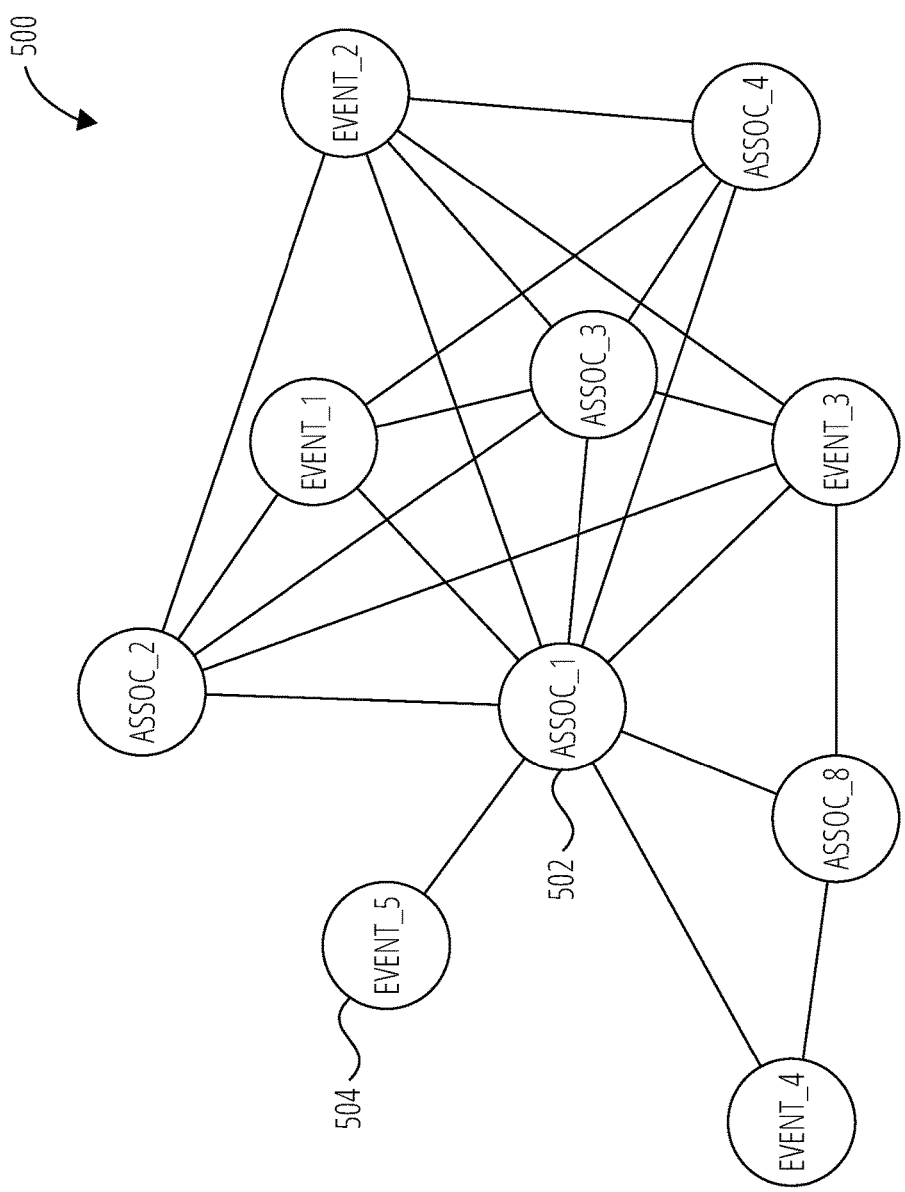
FIG. 5 illustrates an example of a grouping of associate nodes 500 in accordance with embodiments.

FIG. 5 illustrates an example of a grouping of associate nodes 500 in a portion of a graph that may be generated based on a number of common nodes, as discussed above in logic flow 400. In the illustrated example, the graph includes five associates grouped together based on having two or more event nodes in common. Specifically, the grouping of associate nodes 500 includes associate nodes ASSOC_1, ASSOC_2, ASSOC_3, ASSOC_4, and ASSO_8, and event nodes EVENT_1, EVENT_2, EVENT_3, EVENT_4, and EVENT_5. Each of the associate nodes may be linked or have an edge with another associate node when they have at least two event nodes in common in the illustrated example. However, embodiments are not limited in this manner.

In embodiments, the monitoring system 102 may apply a community detection technique to the grouping to detect one or more associate nodes that are coupled with other nodes below (or above) a threshold value to indicate a potential threat. In the illustrated example, associate node (ASSOC_1) 502 is coupled with event node (EVENT_5) 504, which is not coupled with any of the other associate nodes of the grouping. Thus, the monitoring system 102 may determine associate node (ASSOC_1) 502 as a potential threat or least performing events outside of the group's norms. Note that event node (EVENT_5) 504 may be coupled with other associate nodes that are not part of the group. Further and as discussed, the monitoring system 102 may be configured to detect a potential threat when a particular associate node is coupled with more than one event node that is not coupled with other nodes in the group. FIG. 5 is illustrated for example purposes, and in operation, a grouping may include many more nodes and edges. For example, a grouping of five associates may include a hundred event nodes in common. A potential threat may be determined on one of the associate nodes linked to twenty event nodes that are not common with any of the other associate nodes.

In some instances, two or more associate nodes may be indicated as a potential threat based on having common event nodes between each other but not with other nodes in the group. For example, the monitoring system 102 may determine that both ASSOC_1 and ASSOC_8 are potential threats because of their common link with the event node (EVENT_4). Embodiments are not limited to these examples.

Figure 6:
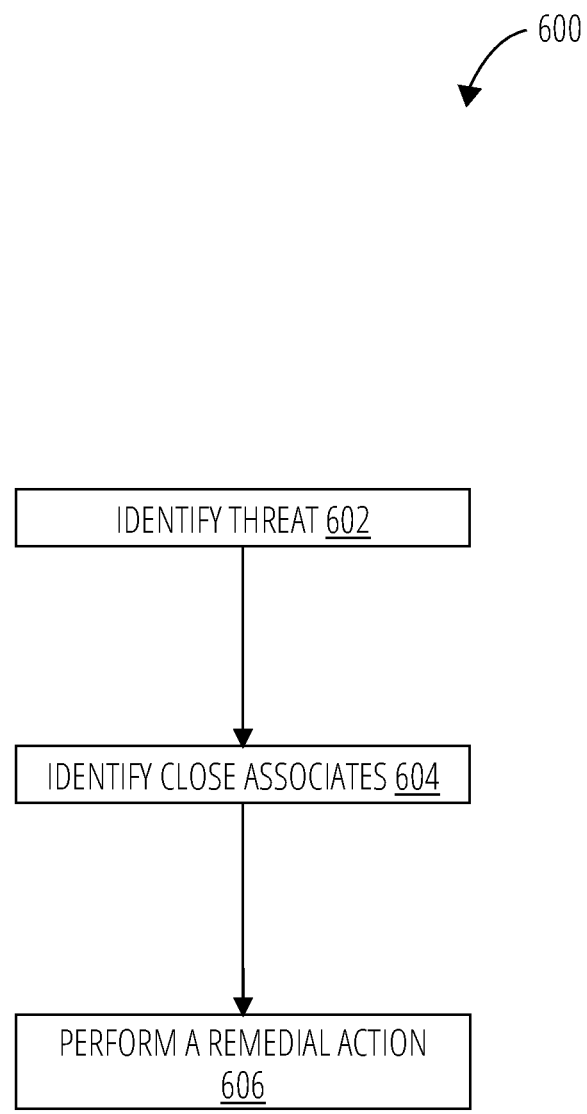
FIG. 6 illustrates an example of a logic flow 600 in accordance with embodiments.

In embodiments, the monitoring system 102 may apply additional analysis techniques to a graph. FIG. 6 illustrates another example of logic flow 600 that may be performed by the monitoring system 102 to detect a potential threat by the monitoring system 102.

At block 602, the logic flow 600 includes identifying a known threat or an occurrence of a threat. An occurrence of a threat may include identifying a breach in security, identifying a violation of a policy or law, or identifying any other non-compliance event performed on an enterprise system and/or against a business. In embodiments, the monitoring system 102 may automatically detect the threat or the occurrence of the threat based on the data provided by one or more systems. For example, one or more of the systems may indicate when data is stored in an improper location, an email is sent to an unintended recipient, a prohibited associate accesses an area, etc. In some embodiments, a user may indicate or provide the occurrence to the monitoring system 102. For example, a user may select, via a GUI, an event node and indicate that the event is an occurrence of a threat.

In embodiments, the monitoring system 102 may utilize the identified threat or detected occurrence to identify additional potential threats. For example, at block 604, the logic flow 600 includes identifying associates close to the event detected as an occurrence of a threat. In one example, the monitoring system 102 may analyze relationships between a node and its relationships with one or more other nodes of known threats. Specifically, the monitoring system 102 may apply a closeness centrality analysis to determine a closeness between a node and the other nodes determined to be a threat. The closeness may be calculated as the reciprocal of the sum of the length of the shortest paths between the node and the other nodes in the graph. In some instances, closeness may be normalized and represents the average length of the shortest paths instead of their sum. The average route distances between the node and the nodes associated with threats may be used. Thus, a node may be considered a potential threat when its closeness calculation indicates that the node is within (close) a centrality threshold value of the node indicated as a threat or occurrence of a threat. At block 606, the logic flow 600 includes performing one or more remedial actions, as previously discussed in logic flow 400.

Figure 7:
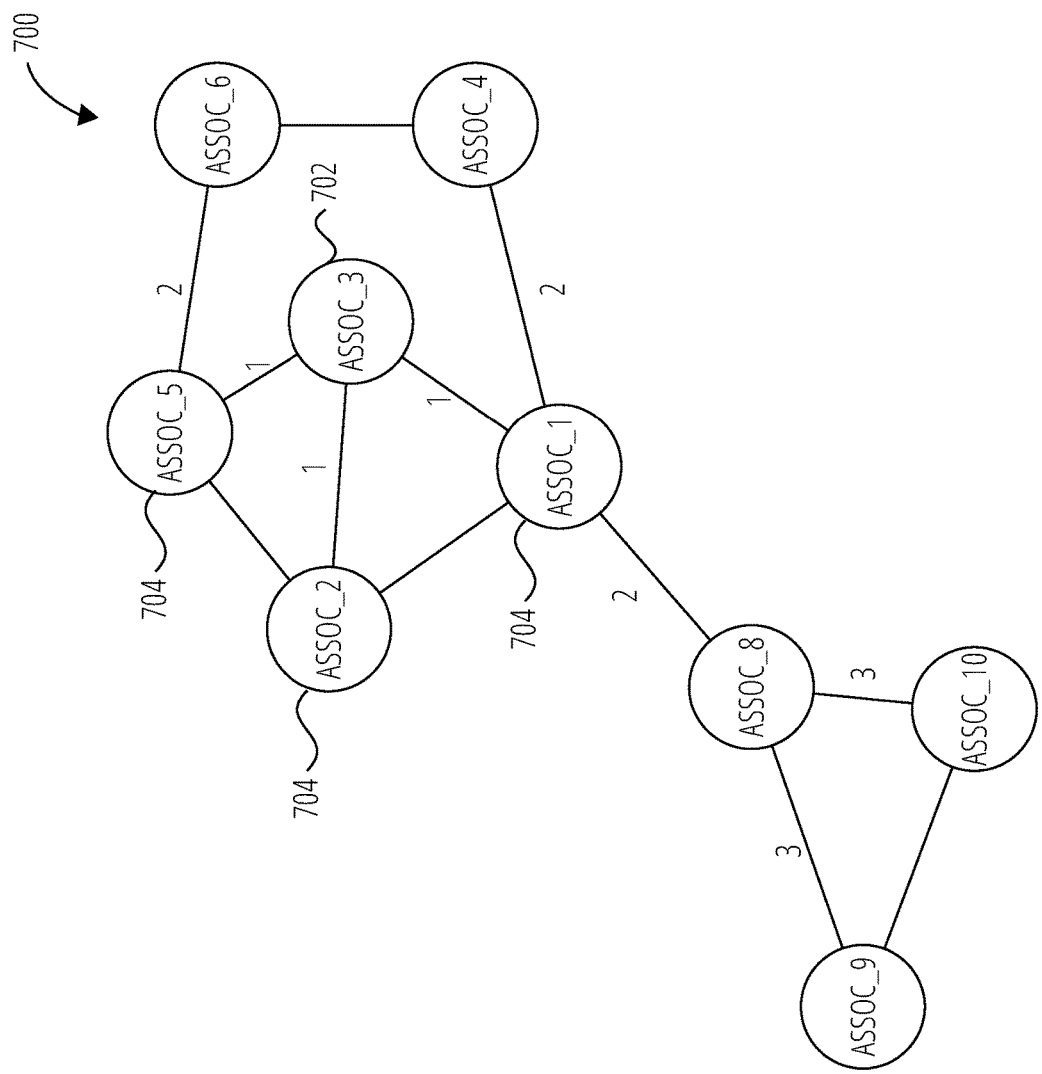
FIG. 7 illustrates an example of a graph 700 in accordance with embodiments.

FIG. 7 illustrates one example of a graph 700 or a portion of a graph indicating a closeness of nodes to an identified threat. In the illustrated example, the ASSOC_3 may be an identified threat 702. The monitoring system 102 may perform a closeness centrality analysis to determine each node's closeness to the identified threat 702. In the illustrated example, each of the edges includes an integer indicating the closeness of a node to the identified threat 702. In this example, the integer is based on the number of nodes between itself and the identified threat 702. For example, the associate node (ASSOC_9) is coupled with the identified threat 702 by three edges indicated by the number 3. In another example, the associate node (ASSOC_6) is coupled to the identified threat 702 by two edges indicated by the number 2. FIG. 7 only provides an integer representation for each node based on the simplest path. However, embodiments are not limited in this manner.

In embodiments, the monitoring system 102 may utilize the result of the closeness centrality analysis to determine additional potential threats. For example, the monitoring system 102 may determine that each node coupled to the identified threat 702 directly by an edge is an additional potential threat 704. In another example, the monitoring system 102 may determine or indicate nodes that are coupled within two edges of the identified threat 702 are potential threats. In some instances, the monitoring system 102 may adjust the closeness configuration and the number of edges between the identified threat 702, and other nodes that are determined to be potential threats. Moreover, the number of edges may be configured by a system of the user.

In embodiments, the monitoring system 102 may present the graph 700 to the user in a GUI interface, and the user may be enabled to interact with the graph 700. For example, a user may select additional nodes as potential threats or deselect indicated potential threats. A user may also change the closeness required for a node to be a potential threat. Additionally, the monitoring system 102 may highlight the identified threat 702 and potential threat 704. For example, the monitoring system 102 may highlight 702 in a first color (red) and the potential threat 704 in a second color (yellow). Embodiments are not limited in this manner.

Figure 8:
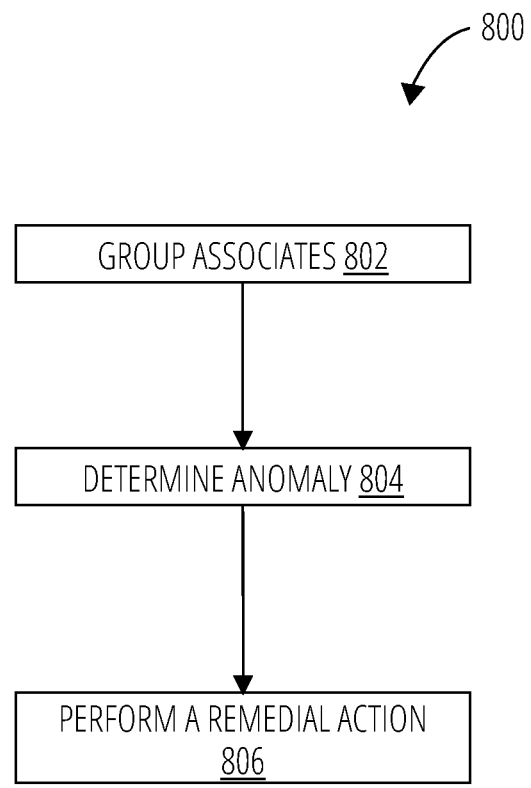
FIG. 8 illustrates an example of a logic flow 800 in accordance with embodiments.

In embodiments, the monitoring system 102 may perform additional analysis techniques. FIG. 8 is an example logic flow 800 that may be performed by the monitoring system 102 to detect potential threats by putting one or more associate nodes into buckets and detecting outliers based on the buckets.

At block 802, the logic flow 800 includes grouping one or more associates and associate nodes into buckets or groupings. For example, the monitoring system 102 may generate buckets of event nodes, representing events or event types. Each of the buckets may represent a range of an event type performed by the associates. In one specific example, the monitoring system 102 may generate buckets on a number of times a particular associate accessed a secure location per week. A first bucket may represent a range of 1-10 accesses, a second bucket may represent a range of 11-100 accesses, and a third bucket may represent a range of 101+ accesses.

The range may be defined over a period of time, e.g., per week, per day, per month, etc. Each of the buckets or event types may be represented as a node in the graph, and each associate may be analyzed and coupled with the appropriate corresponding node. For example, an associate node may be coupled with the second bucket if the associate accessed the secure area in a week. Embodiments are not limited to a specific example, and the monitoring system 102 may generate a number of buckets for each of the event types, e.g., email, access, browsing time, website visits, chat sessions, etc.

At block 804, the logic flow 800 includes analyzing the buckets and detecting an anomaly or outlier. As mentioned, each associate node may be coupled with a particular event type (bucket) node, and the monitoring system 102 may detect the outliers based on a number of coupled associate nodes below or above a threshold value to a particular bucket. With reference to the access example, a graph may include 500 associates, and each of the associates may be coupled with event type nodes representing a number of an associate accessed the secure area in particular. Most of the associate nodes may be coupled with the first bucket (1-10 accesses) or the second bucket (11-100 accesses). However, a small number of associate nodes may be coupled with the third bucket (100+ accesses), indicating a potential threat. For example, if less than 5 associate nodes are coupled with the third bucket, each of the coupled associates may be considered a potential threat. In embodiments, the monitoring system 102 may be configured to alert based on a threshold or percentage amount set for the system. For example, if less than 1% of the associates are coupled with a particular bucket, the monitoring system 102 may determine that this is an outlier. In embodiments, the threshold or percentage may be configurable by a user or automatically by the monitoring system 102.

Moreover, the monitoring system 102 may define the bucket size, e.g., a number of events, to detect the outliers. For example, the bucket sizes for a particular event type may be configured to find associates in the fifth percentile, first percentile, etc. Embodiments are not limited to this specific example.

In embodiments, the logic flow 800 includes performing a remedial action at block 806. As previously discussed, the monitoring system 102 may send an alert, highlight the potential threat, prevent access to one or more systems, and so forth.

Figure 9:
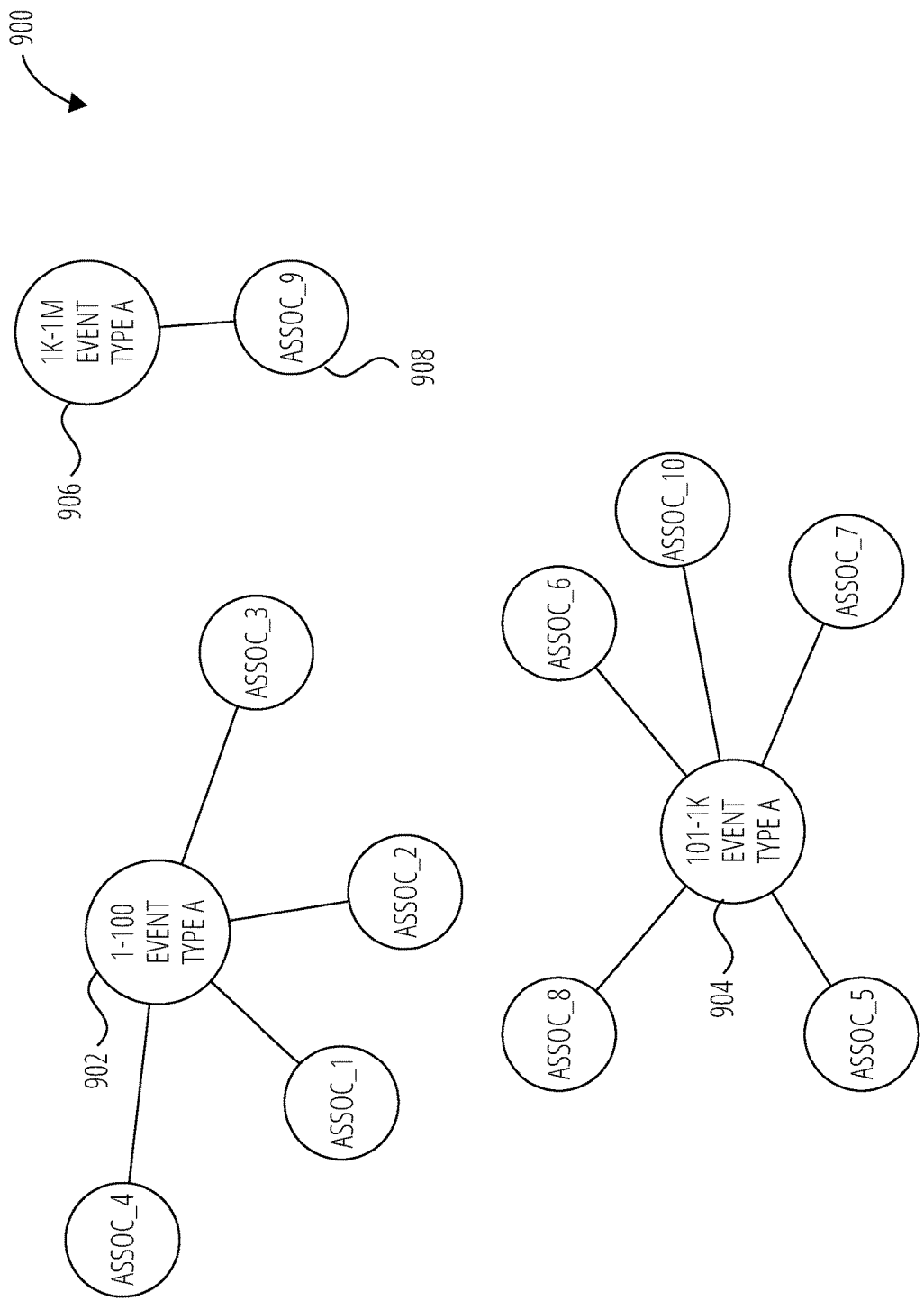
FIG. 9 illustrates an example of a graph 900 in accordance with embodiments.

FIG. 9 illustrates an example of a graph 900 or a portion of a graph that includes associate nodes coupled with event nodes representing event types. Each event node may be defined as a bucket or a range of a number of events performed of the event type. In this illustrated example, three buckets or event nodes represent a range of EVENT TYPE A values. The bucket 902 may be an event node that represents a range from 1 to 100 for EVENT TYPE A, the bucket 904 may be an event node that represents a range from 101-1k for EVENT TYPE A, and the bucket 906 may be an event node that represents a range of 1 k-1M for EVENT TYPE A.

In the illustrated example, the first bucket 902 is linked with four associate nodes, the second bucket 904 is linked with five associate nodes, and the third bucket 906 is linked with one associate node. In the illustrated example, the monitoring system 102 may be configured to alert or indicate a potential threat on buckets that have 10% or fewer associate nodes attached. Thus, in this example, the monitoring system 102 determines that ASSOC_9 node is an outlier 908, and performs a remedial action. Embodiments are not limited to this specific example.

Figure 10:
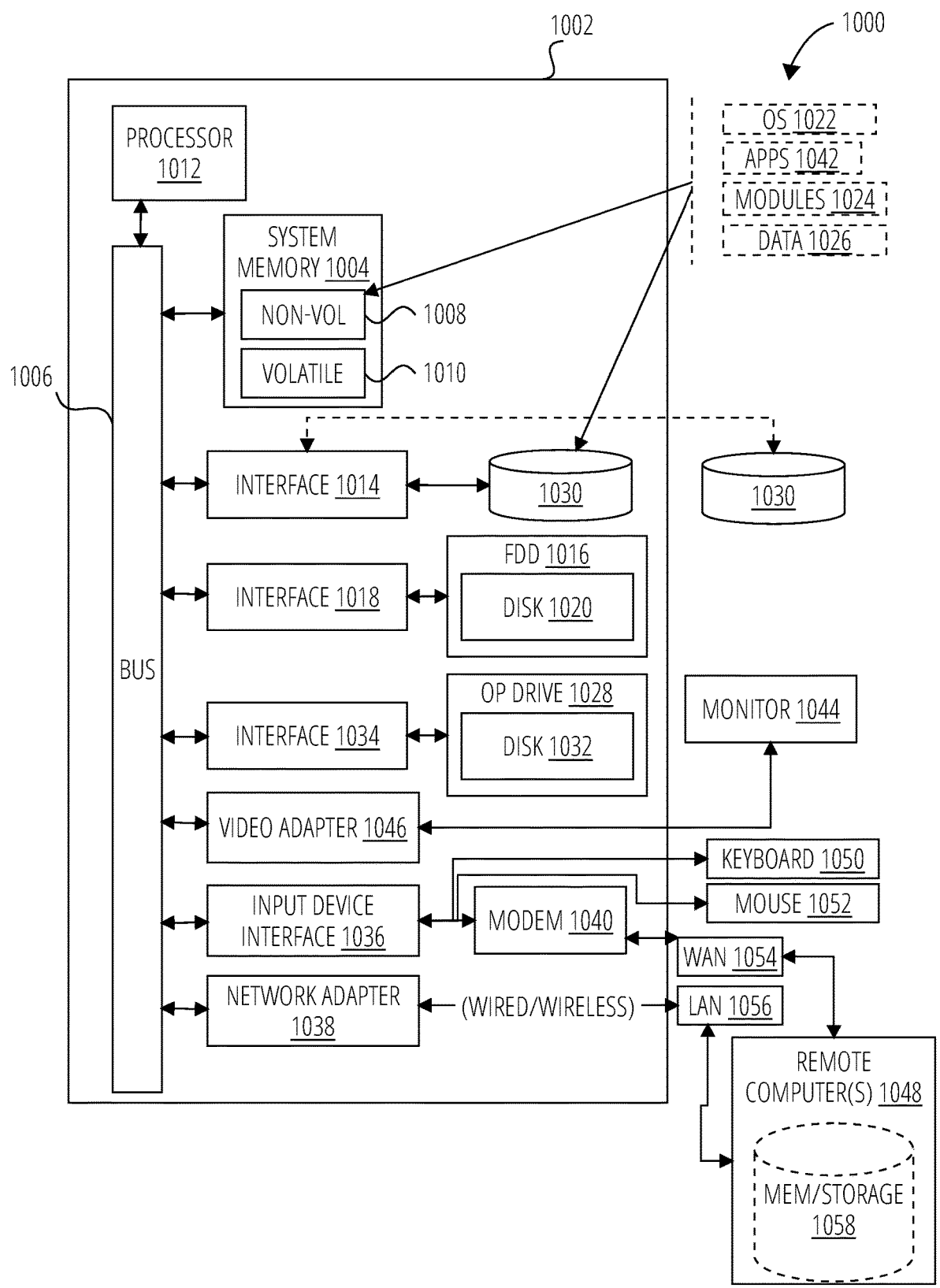
FIG. 10 illustrates a computer architecture 1000 in accordance with one embodiment.

FIG. 10 illustrates an embodiment of an exemplary computer architecture 1000 suitable for implementing various embodiments as previously described. In one embodiment, the computer architecture 1000 may include or be implemented as part of one or more systems or devices discussed herein.

As used in this application, the terms "system" and "component" are intended to refer to a computer-related entity, either hardware, a combination of hardware and software, software, or software in execution, examples of which are provided by the exemplary computing computer architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computer architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computer architecture 1000.

As shown in FIG. 10, the computer architecture 1000 includes a processor 1012, a system memory 1004 and a system bus 1006. The processor 1012 can be any of various commercially available processors.

The system bus 1006 provides an interface for system components including, but not limited to, the system memory 1004 to the processor 1012. The system bus 1006 can be any of several types of bus structure that may further interconnect to a memory bus (with or without a memory controller), a peripheral bus, and a local bus using any of a variety of commercially available bus architectures. Interface adapters may connect to the system bus 1008 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computer architecture 1000 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1004 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1004 can include non-volatile 1008 and/or volatile 1010. A basic input/output system (BIOS) can be stored in the non-volatile 1008.

The computer 1002 may include various types of computer-readable storage media in the form of one or more lower speed memory units, including an internal (or external) hard disk drive 1030, a magnetic disk drive 1016 to read from or write to a removable magnetic disk 1020, and an optical disk drive 1028 to read from or write to a removable optical disk 1032 (e.g., a CD-ROM or DVD). The hard disk drive 1030, magnetic disk drive 1016 and optical disk drive 1028 can be connected to system bus 1006 by an HDD interface 1014, and FDD interface 1018 and an optical disk drive interface 1034, respectively. The HDD interface 1014 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 1008, and volatile 1010, including an operating system 1022, one or more applications 1042, other program modules 1024, and program data 1026. In one embodiment, the one or more applications 1042, other program modules 1024, and program data 1026 can include, for example, the various applications and/or components of the systems discussed herein.

A user can enter commands and information into the computer 1002 through one or more wire/wireless input devices, for example, a keyboard 1050 and a pointing device, such as a mouse 1052. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 1012 through an input device interface 1036 that is coupled to the system bus 1006 but can be connected by other interfaces such as a parallel port, IEEE 1394 serial port, a game port, a USB port, an IR interface, and so forth.

A monitor 1044 or other type of display device is also connected to the system bus 1006 via an interface, such as a video adapter 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all the elements described relative to the computer 1002, although, for purposes of brevity, only a memory and/or storage device 1058 is illustrated. The logical connections depicted include wire/wireless connectivity to a local area network 1056 and/or larger networks, for example, a wide area network 1054. Such LAN and WAN networking environments are commonplace in offices and companies, and facilitate enterprise-wide computer networks, such as intranets, all of which may connect to a global communications network, for example, the Internet.

When used in a local area network 1056 networking environment, the computer 1002 is connected to the local area network 1056 through a wire and/or wireless communication network interface or network adapter 1038. The network adapter 1038 can facilitate wire and/or wireless communications to the local area network 1056, which may also include a wireless access point disposed thereon for communicating with the wireless functionality of the network adapter 1038.

When used in a wide area network 1054 networking environment, the computer 1002 can include a modem 1040, or is connected to a communications server on the wide area network 1054 or has other means for establishing communications over the wide area network 1054, such as by way of the Internet. The modem 1040, which can be internal or external and a wire and/or wireless device, connects to the system bus 1006 via the input device interface 1036. In a networked environment, program modules depicted relative to the computer 1002, or portions thereof, can be stored in the remote memory and/or storage device 1058. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described herein may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds, and other design or performance constraints, as desired for a given implementation.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Figure 11:
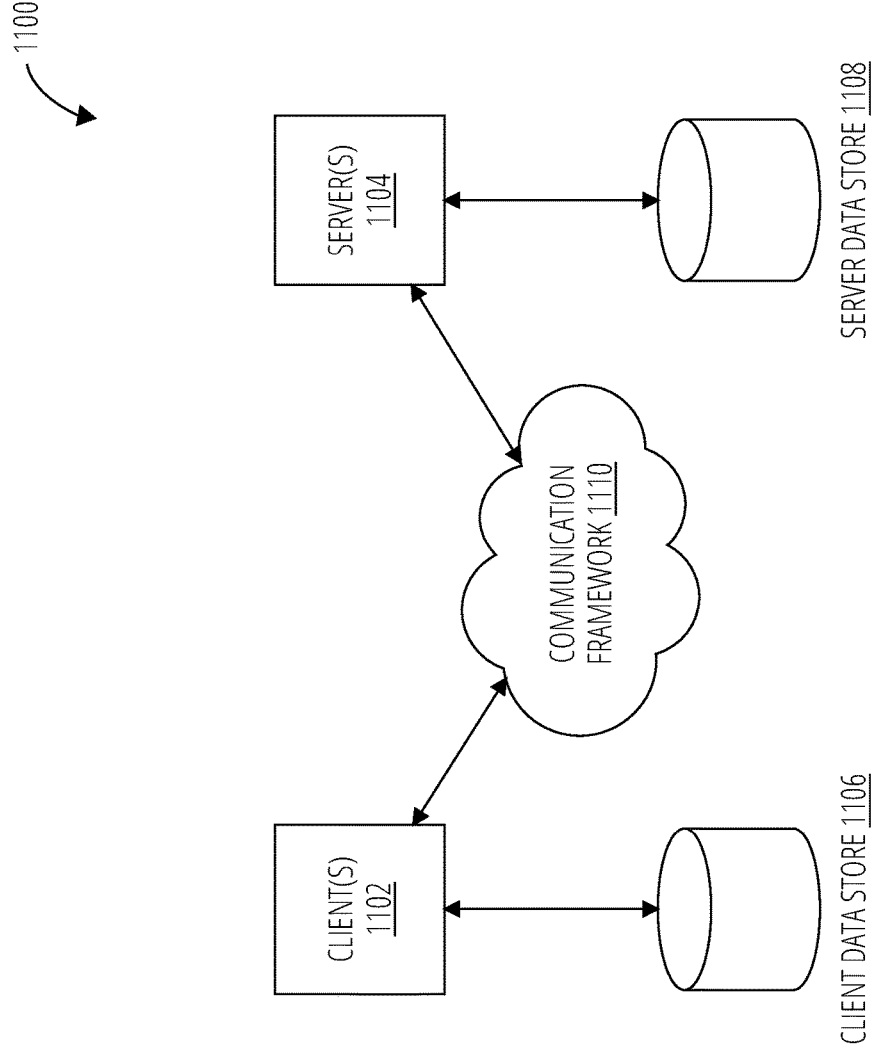
FIG. 11 illustrates a communications architecture 1100 in accordance with one embodiment.

FIG. 11 is a block diagram depicting an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100, which may be consistent with systems and devices discussed herein.

As shown in FIG. 11, the communications architecture 1100 includes one or more client(s) 1102 and server(s) 1104. The server(s) 1104 may implement one or more functions and embodiments discussed herein. The client(s) 1102 and the server(s) 1104 are operatively connected to one or more respective client data store 1106 and server data store 1108 that can be employed to store information local to the respective client(s) 1102 and server(s) 1104, such as cookies and/or associated contextual information.

The client(s) 1102 and the server(s) 1104 may communicate information between each other using a communication framework 1110. The communication framework 1110 may implement any well-known communications techniques and protocols. The communication framework 1110 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1110 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount of speed and capacity, distributed network controller architectures may similarly be employed to pool, load balance, and otherwise increase the communicative bandwidth required by client(s) 1102 and the server(s) 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

What is claimed is:

1. A system to generate graphs of associates and events based on digital footprints of the associates, comprising:
    a data store comprising data, the data comprising the associates and the events performed by the associates;
    one or more processors coupled with the data store; and
    memory comprising instructions that, when executed by the one or more processors, cause the one or more processors to:
    retrieve the data from the data store;
    generate, with the data, a graph comprising associate nodes and event nodes, wherein the associate nodes connect with the event nodes via edges, wherein at least one associate node directly connects to another associate node via an edge;
    generate a grouping of associate nodes comprising two or more of the associate nodes, each associate node in the grouping of associate nodes comprising an edge to a number of event nodes, each of which at least one other associate node in the grouping of associate nodes has an edge connected thereto, the number of event nodes defined by a threshold value;
    generate an edge between each of the associate nodes in the grouping of associate nodes that have at least one event node in common with each other;
    determine an associate node of the grouping of associate nodes having an edge with an event node, wherein the event node includes a second number of edges with other associate nodes of the grouping of associate nodes below a second threshold value; and
    generate an indication identifying the associate node.

2. The system of claim 1, wherein the threshold value is configurable by a user of the system to be any value.

3. The system of claim 1, wherein the instructions to generate the graph cause the one or more processors to generate, for each associate node, an edge between a particular associate node and a particular event node when an associate of the particular associate node performs an event of the particular event node.

4. The system of claim 1, wherein each associate node represents an associate identified by an associate identifier, and each event node represents an event identified by an event identifier.

5. The system of claim 4, wherein each associate has access to at least one system hosted by a first-party organization and a third-party organization, and each event comprises an interaction with the at least one system hosted by the first-party organization or by the third-party organization.

6. The system of claim 1, comprising one or more networking interfaces, wherein the one or more networking interfaces couple with one or more systems hosted by a first-party organization or a third-party organization, wherein the instructions cause the one or more processors to collect the data from the one or more systems, wherein the one or more systems comprising an access system, a network system, an electronic mail system, a print system, a chat system, an application system, or a combination thereof.

7. The system of claim 1, comprising a display device, wherein the instructions cause the one or more processors to present the graph on the display device.

8. The system of claim 7, wherein the instructions cause the one or more processors to present the indication identifying the associate node in the graph on the display device.

9. The system of claim 1, wherein the instructions cause the one or more processors to send the indication to a device as an alert to display on a display device of the device.

10. The system of claim 1, wherein the instructions cause the one or more processors to group each of the associate nodes into one of a plurality of buckets based on a number of times an associate of a particular associate node performed an event associated with another event node.

11. The system of claim 10, wherein the instructions cause the one or more processors to:
determine one of the plurality of buckets includes a number of associate nodes below a third threshold value; and
send a second indication to indicate that one of the plurality of groupings includes the number of associate nodes below the third threshold value.

12. The system of claim 10, wherein the instructions cause the one or more processors to:
determine one of the plurality of buckets includes a number of associate nodes above a fourth threshold value; and
send a second indication to indicate that one of the plurality of groupings includes the number of associate nodes above the fourth threshold value.

13. A system, comprising:
a data store comprising data, the data comprising associates and events performed by the associates;
one or more processors coupled with the data store; and
memory comprising instructions that, when executed by the one or more processors, cause the one or more processors to:
generate, with the data, a graph comprising associate nodes and event nodes, wherein the associate nodes connect with the event nodes via edges, wherein at least one associate node directly connects to another associate node via an edge;
group each of the associate nodes into one of a plurality of buckets based on a number of times an associate of a particular associate node performed an event associated with a particular event node;
generate an edge between each of the associate nodes in the grouping of associate nodes that have at least one event node in common with each other;
determine a bucket of the plurality of buckets is an anomaly based on a number of associate nodes in the bucket and a threshold value; and
send an indication to indicate the associate nodes of the bucket is the anomaly.

14. The system of claim 13, wherein the threshold value is adjustable by a user of the system over a period of time.

15. The system of claim 13, wherein the instructions to generate the graph to cause the one or more processors to generate, for each associate node, an edge between an associate node and an event node when an associate of the associate node performs an event of the event node.

16. The system of claim 13, comprising a display device, and the instructions to cause the one or more processors to present the graph on the display device, and the indication identifying the associate node in the graph.

17. The system of claim 13, wherein the instructions to cause the one or more processors to send the indication to a device as an alert to display on a display device of the device.

18. The system of claim 13, wherein the instructions to cause the one or more processors to:
generate a grouping of associate nodes comprising two or more of the associate nodes, each associate node in the grouping of associate nodes comprising a number of edges to the event nodes in common with each other above a second threshold value;
determine an associate node of the grouping of associate nodes having an edge with an event node, wherein the event node having a second number of edges other associate nodes of the grouping of associate nodes below a third threshold value; and
send a second indication identifying the associate node.

19. The system of claim 18, wherein the instructions to cause the one or more processors to determine the grouping includes the number of associate nodes above the second threshold value.

20. The system of claim 18, wherein the instructions to cause the one or more processors to determine the grouping includes the number of associate nodes below the third threshold value.

* * * * *